United States Patent [19]
Stana

[11] 3,853,756
[45] Dec. 10, 1974

[54] REVERSE PRESSURE CLEANING OF SUPPORTED SEMIPERMEABLE MEMBRANES

[75] Inventor: Regis R. Stana, Murrysville, Pa.

[73] Assignee: Westinghouse Electric Corporation, Pittsburgh, Pa.

[22] Filed: Feb. 12, 1973

[21] Appl. No.: 331,458

[52] U.S. Cl.............. 210/23, 210/82, 210/412, 210/433
[51] Int. Cl............................................ B01d 13/00
[58] Field of Search ............ 210/23, 411, 412, 321, 210/433, 257, 258, 82

[56] References Cited
UNITED STATES PATENTS

| | | | |
|---|---|---|---|
| 3,536,612 | 10/1970 | Kopecek et al. | 210/23 |
| 3,541,006 | 11/1970 | Bixler et al. | 210/321 X |
| 3,548,241 | 8/1971 | Vondracek et al. | 210/321 |
| 3,552,574 | 1/1971 | Lowe et al. | 210/353 |
| 3,679,055 | 7/1972 | Clark et al. | 210/433 X |

Primary Examiner—Frank A. Spear, Jr.
Attorney, Agent, or Firm—D. P. Cillo

[57] ABSTRACT

Foulants are removed from the surface of a supported semipermeable membrane by (A) contacting the feed side of a semipermeable membrane, supported by a wall of a module comprising resin bonded filler particles, with a continuous stream of liquid feed solution under a driving pressure of up to about 1,000 psi, (B) applying a back pressure, on the support side of the membrane, of up to about 50 psi greater than the driving pressure, to cause a backflow of liquid through the membrane, from the support side to the feed side, and (C) flushing the solution containing the concentrated foulants from the feed side membrane surface.

9 Claims, 2 Drawing Figures

3,853,756

REVERSE PRESSURE CLEANING OF SUPPORTED SEMIPERMEABLE MEMBRANES

BACKGROUND OF THE INVENTION

Osmosis occurs when two solutions of different concentrations in the same solvent are separated from one another by a membrane. if the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names reverse osmosis and pressure osmosis are used to describe this process.

Ultrafiltration is the name used to describe the process of filtering solute molecules at least one to two times larger than solvent molecules. Some large molecules can be filtered without developing significant osmotic pressure, and because of this, the operating pressures for ultrafiltration may be as low as 15 psi. Reverse osmosis, on the other hand, refers to filtering of solutes of the same order to magnitude in size as the solvent, at pressures of about 400 to 600 psi.

Both processes depend on minimizing concentration polarization, the build up of rejected solutes at the membrane surface, and the limiting factor, in the life of the membrane, is generally the rate of fouling which occurs at the feed side of the membrane. This fouling, which is a concentration of solid materials, reduces both the flux of the membrane and may change its rejection capability. A technique for quick removal of the fouling material is essential for the economic operation of a reverse osmosis or ultrafiltration system. This problem is particularly acute in the reverse osmosis or ultrafiltration of feed solutions containing a high concentration of suspended solids, such as sewage, or casein in cheese whey, or a high concentration of dissolved large molecules and proteins, such as lactalbumen in waste liquids such as cheese whey.

Heretofore, turbulent flow, turbulence promoters and high shear of the feed liquid have been relied upon to prevent build up of rejected solutes at the membrane surface. Several liquid reversal techniques have also been developed for use in an operating reverse osmosis system. Kopecek, in U.S. Pat. No. 3,536,612, teaches a 300 to 800 psi. back pressure treatment of reverse osmosis membranes, to enlarge the membrane pore structure and alter the basic transport properties of the membrane. Bray, in U.S. Pat. No. 3,505,215, teaches periodic cleaning of filters used in spiral wound reverse osmosis modules, by reversal of the feed flow using automatically controlled valves. Neither of these techniques is feasible in a reverse osmosis or ultrafiltration system which does not use separate filters and where it is not desired to alter the pore structure of the semipermeable membrane.

SUMMARY OF THE INVENTION

A process has been discovered that will quickly and economically remove concentrated solid material foulants from the feed side of a membrane contained within a reverse osmosis or ultrafiltration liquid treatment system. The method consists of (A) passing the feed solution containing foulants such as dissolved impurities under a driving pressure, through a liquid treatment system comprising a semipermeable membrane supported by a module comprising resin bonded filler particles, (B) applying a back pressure, on the support side of the membrane, of up to about 50 psi greater than the driving pressure, to cause a reversal of liquid flow through the membrane, and (C) flushing the solution containing the concentrated solid foulants from the feed side membrane surface.

BRIEF DESCRIPTION OF THE DRAWINGS

For a better understanding of the invention, reference may be made to the preferred embodiments exemplary of the invention, shown in the accompanying drawings, in which.

DESCRIPTION OF THE PREFERRED EMBODIMENTS

Figure 1:
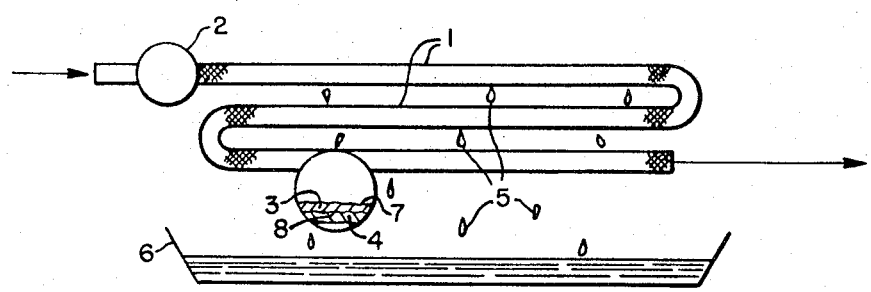
FIG. 1 is a diagram showing the principle for purifying contaminated feed solution by a reverse osmosis or ultrafiltration liquid treatment system, containing a supported tubular membrane, feed inlet means, pumping means and treated liquid outlet means.

FIG. 1 illustrates a typical tubular-type reverse osmosis or ultrafiltration system. Feed solution is pumped through a battery of support tubes or modules 1. The feed pump 2 operates at a driving pressure of between about 10 to 1,000 psi. The tubes can be mounted in batteries of about 25 to 150 each. They serve to support the selective polymeric semipermeable membrane 3 contained within the interior tube wall.

The ultrafiltration or reverse osmosis membrane is usually made for example, of polysulfone, polyethylene or an ether or ester cellulosic derivative such as cellulose acetate, cellulose propionate, cellulose butyrate, methyl cellulose or ethyl cellulose, among others. Generally, modified cellulose acetate is a preferred membrane and can be cast from a solution comprising cellulose acetate, acetone and formide. The membrane may also contain varying amounts of filler particles. Reference can be made to U.S. Pat. Nos. 3,170,867; 3,310,488; 3,344,214; 3,446,359; and 3,593,855 and *Chemical Engineering*, Sept. 4, 1972, pp 56-73, for detailed information concerning these mateials, their method of manufacture and a description of the membrane separation processes. These membranes may have a dense osmotic skin layer which faces the feed solution and a highly porous spongy sublayer which contacts the membrane support or, as in the case of ultrafiltration membranes, they may have a relatively uniform cross-section of pores and tortuous channels extending through the thickness of the membrane.

The preferred porous support module is a tubular casting made from, for example, epoxy, polyester, silicone or phenolic resin bonded filler particles having a granular structure such as sand, quartz, zircon, alumina, limestone, beryl or mixtures, as described in U.S.

Pat. No. 3,598,241. The support module walls 4 usually constitute about 2 to 18 weight percent resin, based on resin coated filler particle weight, and the filler has an average particle size between about 10 to 500 microns. The tube walls that contact and support the reverse osmosis or ultrafiltration membranes are the axial interior feed bores of the module. They must be able to withstand the driving pressure exerted on them by the pump and must be able to allow egress of the purified solution 5 into a collecting reservoir means 6, which may be disposed above the membranes, or below the membranes as shown. Other module materials and module configurations, such as porous fiberglass materials and flat plate type modules, well known in the art, can be used to support the membranes in the method of this invention.

After about 5 minutes operation, with a feed solution containing a high concentration of suspended solids or a high concentration of dissolved protein molecules, the concentration of solid material, as a boundary layer of colloidal gel, near or on the surface of the feed side 7 of the membrane, will impair or completely reduce egress of the purified solution 5. For example, a membrane with a product flux of 200 gal/sq. ft. active membrane surface/day on pure water at 100 psi, will only give a product flux of about 5 to 15 gal/sq. ft/day on cheese whey at the same pressure, after only a few minutes of operation, due to membrane fouling.

In one embodiment of the method of this invention, the pressure on the feed side of the membrane is released, and a positive back pressure is applied to the support module contacting side 8 of the membrane, by a second pump or other suitable back pressure means. The purified product solution 5 can be pumped to a reservoir disposed 5 to 100 feet about the reverse osmosis system. When the feed to the modules is stopped, this would automatically provide a 5 to 100 foot head back pressure on the support side 8 of the membranes in the modules.

Figure 2:
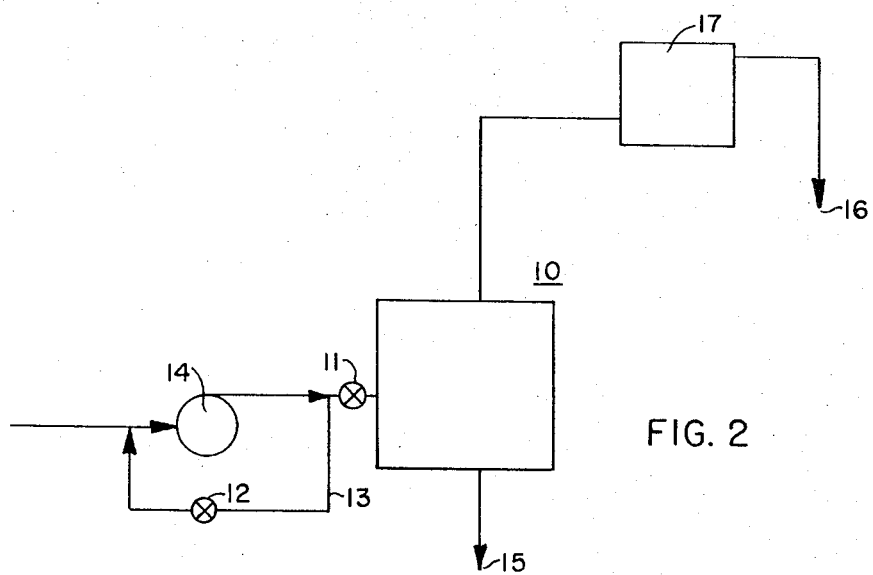
FIG. 2 is a schematic diagram of one embodiment of the method of this invention, showing a liquid treatment system, valve configurations and a permeate reservoir disposed above the system to provide back pressure.

As shown in FIG. 2, for a whey feed solution containing dissolved and suspended foulants, solenoid valves 11 and 12 can be used before the reverse osmosis system 10, and in a recycle line 13 from the feed pump 14. An operating cycle would consist of opening valve 11 with the feed pump operating. Valve 12 would be closed and the system would operate for a fixed period of time, generally a cycle of about 30 to 300 seconds, with the lactose and protein concentrate 15 and deprotonized permeate 16 being separated.

Valve 11 would then be closed and valve 12 opened for a short fixed period of time effective to clean the membrane by back pressure, generally about 5 to 30 seconds. This operation would release the driving pressure on the feed side of the membrane and allow the liquid permeate to flow from the collecting reservoir 17 back through the membrane in the reverse osmosis system 10. This, along with flushing the system, would remove the protein and lactose fouling layer near or on the membrane. Another operating cycle would then be started. Preferably, the time ratio of driving pressure: backflow pressure will be about 2 to 30:1, with the optimum time cycle ratio being about 30 to 90 seconds feed pump driving pressure: 10 seconds with the feed pump off.

In order not to harm the membrane, separate it from its support or alter its pore structure or transport properties, the net back pressure on the support module contacting side of the membrane should not be over about 50 psi (3 kg/sq. cm), i.e., back pressure minus driving pressure should not be greater than about 50 psi. The release of pressure on the feed side of the membrane may in some cases, alone, cause a liquid backflow through the membrane by natural osmosis of about 3 gal/sq. ft. membrane surface/day. A positive pressure of between about 2 to 50 psi (0.1 to 3 kg/sq. cm) applied to the support side of the membrane, in addition to the release of the driving pressure, is to be preferred, to provide a liquid backflow of between about 3 to 60 gal/sq.ft./day (120 to 24,601/m$^2$/day). If the driving pressure is not released or is only partially released, then a back pressure, on the support side of the membrane, of up to about 50 psi. greater than the driving pressure, can be applied. This backflow of liquid through the membrane removes gross solids concentrated near or attached to the feed side of the membrane, and fouling residue trapped near the feed side surface within the membrane.

EXAMPLE 1

The liquid purification system used consisted of a driving feed pump, a cylindrical reverse osmosis module containing 18 axial feed bores, the inside walls of which supported semipermeable ultrafiltration membranes, and a permeate reservoir tank located 17 feet vertically above the module.

The membranes were cast in place in the module bores from a silica filled casting solution, containing about 20 weight percent cellulose acetate, 45 weight percent acetone and 35 weight percent formamide liquid component, and were of substantially uniform cross-section having an average pore diameter of about 40 to 60 A. Preferred ultrafiltration membranes will have an average pore size diameter of between about 10 to 150 angstrom units. The membranes used had no NaCl rejection and about 5 to 10 percent rejection on sucrose.

The membranes in tubular form, were supported by the interior walls of eighteen, ½ inch diameter axial bores through a cylindrical support module. The module was 48 inches long with a 4 inch outside diameter, and was made of phenolic resin bonded 180 micron foundry sand particles, with about 4 weight percent resin content based on resin coated filler particle weight. The sand module contained about 9 sq. ft. of active membrane surface area. The sand module in turn was enclosed in a stainless steel shell having permeate outlet holes.

Using this liquid purification system, the following data was obtained using a feed pump pressure of 70 psi. and a temperature of 24°C. The feed solution contained protein and lactose fraction from ultrafiltration of a whey protein lactose concentrate.

TABLE 1

| Feed | Operating Cycle | Product Flux (ml/min) | Back Pressure (psi) | Reverse Flux (ml/min) | Time (min) |
| --- | --- | --- | --- | --- | --- |
| tap water 0.5% lactalbumen | continuous | 2800 ml/min | — | — | — |
| | continuous | 1000 ml/min | — | — | 2 |

TABLE 1 – Continued

| Feed | Operating Cycle | Product Flux (ml/min) | Back Pressure (psi) | Reverse Flux (ml/min) | Time (min) |
|---|---|---|---|---|---|
| 0.5% lactose | | | | | |
| do. | continuous | 420 ml/min | — | — | 45 |
| do. | continuous | 450 mil/min | — | — | 60 |
| do. | 10 sec. pump off 50 sec. pump on | 820 ml/min | 7.5 | 150 | 120 |
| do. | 5 sec. pump off 55 sec. pump on | 880 ml/min | 7.5 | 150 | 180 |
| do. | 10 sec. pump off 90 sec. pump on | 850 ml/min | 7.5 | 150 | 300 |
| do. | continuous | 506 ml/min | — | — | 360 |

As can be seen from the Table, the product flux decreased from 2,800 to 1,000 ml/min, 2 minutes after the lactalbumen and lactose were added to the tap water. After operation for 60 minutes, the product flux was down to 450 ml/min, whereupon a back pressure was applied, by shutting off the feed pump and releasing reservoir back pressure, causing the net product flux to rise to 820 ml/min after total operation of 120 minutes. Periodic back pressure maintained this level. Subsequent continuous operation decreased product flux to 506 ml/min. The back pressuring is made possible by the integral bond of the membrane to the sand walls which permits continuous cycling at suitable pressures without damaging or causing separation of the membrane. The back pressure in this case caused a reverse flux of about 6 gal/day for each sq. ft. of membrane surface area.

When the pressure is increased, the flux does increase instantaneously, but so does the fouling rate which returns the flux to its original level in a few seconds. Increases in applied pressure to the feed also extends to compact the foulant gel on the membrane. Thus, low driving pressure operation of from about 15 to 250 psi is preferred, since it saves energy costs and prevents shearing of the whey solution.

Backpressuring can also be used in low driving force ultrafiltration of such other materials as blood, enzymes and other proteinaceous solutions which can be damaged by the high shear velocities that some ultrafiltration membranes require for efficient operation.

I claim:

1. A method of cleaning foulants from the surface of a supported semipermeable membrane having a feed side and a support side, comprising the steps of:
   a. contacting the feed side of a porous semipermeable membrane, supported by and integrally bonded to the wall of a module comprising resin bonded filler particles, for a period of time, with a continuous stream of liquid feed solution containing foulants under a pressure of up to about 1000 psi, wherein said foulants concentrate at the membrane feed side surface;
   b. releasing the pressure on the feed side of the membrane, for a period of time of between about 5 to about 30 seconds, and activating a means to cause a back pressure on the support side of the membrane of between about 2 to 50 psi to cause a backflow of liquid through the membrane of between about 3–60 gal/sq. ft./day from the support side to the feed side of the membrane, without altering the membrane pore structure, said backflow being effective to remove foulants concentrated at the membrane feed side surface;
   c. applying a driving pressure of up to about 1,000 psi to the feed solution to flush the foulants from the feed side of the membrane wherein the time cycle ratio of driving pressure time: back pressure time is over 2:1; and
   d. repeating step (b) and then step (c) at least twice.

2. The method of claim 1 wherein the module is a tubular module having at least one interior axial feed bore therethrough, said membrane being supported by the interior feed bore wall.

3. The method of claim 2, wherein the means to apply backpressure is a liquid reservoir disposed above the membrane.

4. The method of claim 2, wherein the means to apply backpressure is a pump.

5. The method of claim 2 wherein the backpressure is applied in a time cycle ratio of driving pressure time; backpressure time of about 2 to .30:1.

6. The method of claim 5 wherein the module resin is selected from the group consisting of epoxy resin, polyester resin, phenolic resin and silicone resin, the module filler is selected from the group consisting of sand, quartz, zircon, alumina, limestone, beryl and mixtures thereof and the membrane is selected from the group consisting of polysulfone, polyethylene and ether and ester cellulosic derivatives.

7. The method of claim 5, wherein the driving pressure is between about 15 to 250 psi and the membrane is selected from the group consisting of polysulfone, polyethylene, cellulose acetate, cellulose propionate, cellulose butyrate, methyl cellulose and ethyl cellulose.

8. The method of claim 7 wherein the backpressure is applied in a time cycle ratio of driving pressure time: backpressure time of about 3 to 9:1, the membrane is modified cellulose acetate having a relatively uniform cross section, the module resin is phenolic resin and the module filler is sand, said resin constituting about 2 to 18 weight percent based on resin coated filler particle weight.

9. The method of claim 7 wherein the membrane is an ultrafiltration membrane having an average pore size diameter of between about 10 to 150 angstrom units, and the feed solution has a high concentration of suspended solids.

* * * * *